United States Patent [19]

Gray et al.

[11] Patent Number: 4,592,121
[45] Date of Patent: Jun. 3, 1986

[54] TIRE AND WHEEL ASSEMBLY

[75] Inventors: Gary L. Gray, Novi; Leo P. Gajda, New Boston, both of Mich.

[73] Assignee: Kelsey-Hayes Company, Romulus, Mich.

[21] Appl. No.: 462,575

[22] Filed: Jan. 31, 1983

[51] Int. Cl.⁴ .................................................. B21K 1/38
[52] U.S. Cl. ........................................ 29/159.1; 29/512; 29/802
[58] Field of Search ............. 29/159.1, 159.01, 159 R, 29/802, 512; 152/379.3, 382, 383; 72/122, 123

[56] References Cited

U.S. PATENT DOCUMENTS

| | | | |
|---|---|---|---|
| 1,609,597 | 12/1926 | Arnt | 29/512 |
| 3,683,479 | 8/1972 | Lejeune | 29/159.01 |
| 3,708,847 | 1/1973 | Mitchell | 29/159.01 |
| 4,334,417 | 6/1982 | Victor | 29/159.01 |

Primary Examiner—Howard N. Goldberg
Assistant Examiner—P. W. Echols
Attorney, Agent, or Firm—Ralph J. Skinkiss; David D. Murray; Richard S. MacMillan

[57] ABSTRACT

An integral tire and rim assembly includes a flanged annulus having an uninterrupted, substantially constant diameter outer surface, a centrally disposed spider and a tire having inextensible beads of a diameter smaller than the diameter of the rim flanges. A method for fabricating the integral tire and rim comprises the steps of forming an annulus having a substantially uniform diameter and a first generally radially extending flange, forming a spider, securing the spider within the flange, mounting a tire on the rim and forming a second generally radially extending flange in the annulus, thereby securing the tire on the rim between the two flanges.

5 Claims, 9 Drawing Figures

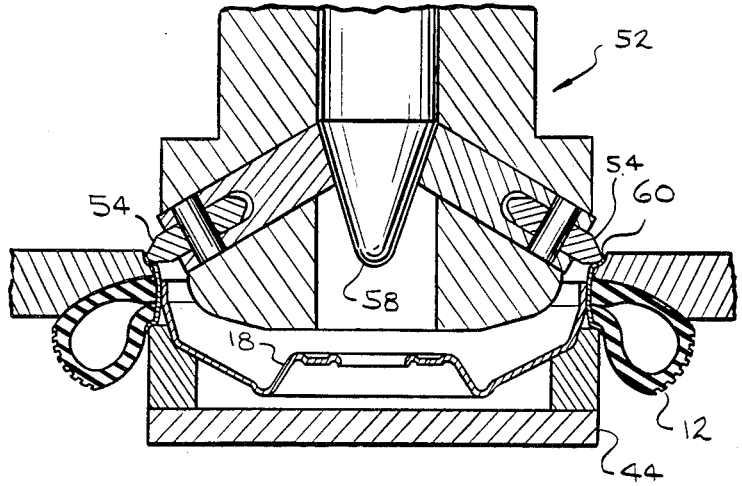

TIRE AND WHEEL ASSEMBLY

BACKGROUND OF THE INVENTION

The invention relates generally to vehicle tires and rims and more particularly to an integral tire and rim assembly wherein the tire and rim components are permanently secured to one another thereby forming a wheel and tire assembly from which the tire may not be dismounted.

A major result from the shift to smaller, energy efficient vehicles has been the change of drive trains from rear wheel drive to front wheel drive. The front wheel drive power train offers many advantages which are consonant with the goal of fuel efficiency such as a shortened and simplified power flow path and reduced power train component weight. Several other features of front wheel drive systems, both inherent and peripheral, such as transverse engine mounting, improved interior vehicle space, and simplified vehicle assembly are also harmonious with the contemporary goal of the energy efficient vehicle.

Examination of the front wheel drive power train reveals that not every aspect is synergistic, or even complementary, with other design constraints. The difficulties attendant providing the five functions of rotation, suspension, drive, steering, and braking provide a case in point. Such plural and diverse functions place a great premium on space in the region adjacent the wheels and no where is this more true than with regard to the braking mechanism which is typically disposed adjacent and preferably concentrically and axially within the wheel rim itself. A new generation of vehicle wheels having the spider disposed in substantially the same plane as the outboard wheel flange to accommodate the braking mechanism substantially within the wheel rim is common place.

One design consideration which has hampered further reductions in size and thus also weight is the necessity of including an inwardly directed well in the rim which receives the inextensible beads of a tire during installation and removal from the rim. Elimination of the well would provide additional volume within the wheel rim to accommodate brake and drive components.

Elimination of the well in the wheel rim is desirable from a second standpoint. As noted above, the tire beads and thus its inside diameter are substantially inextensible. The inclusion of the wheel rim well is thus mandated by the necessity of installing tires on the rim.

The prior art discloses wheel rims without wells as well as at least one method for assembling same. U.S. Pat. No. 3,639,964 discloses a well-less rim having one conventional flange and a smaller flange which is first deformed inwardly to a diameter no greater than the outside diameter of the rim. An annular flange having a cross section similar in cross section to the conventional flange is then placed onto the rim with the tire and the inwardly deformed, smaller flange is then rolled outwardly into position to maintain both the tire and the annular flange on the rim. Maintenance of proper tire bead to rim seal in this design appears to be problematic due to the circumferential gap between the annular flange and rim and air pressure within the tire which tends to force it radially away from the rim.

U.S. Pat. No. 4,121,643 discloses a rim which is fabricated with a pair of wells, one of which is filled with a resilient ring and the second of which is collapsed onto itself after the tire has been installed on the rim in a conventional manner. This configuration does not, of course, provide improved internal rim volume inasmuch as the wells are, in fact, present though in a modified form. It does, however, apparently provide improved run-flat performance.

SUMMARY OF THE INVENTION

The instant invention relates to an integral tire and wheel assembly for a motor vehicle and a method for fabricating same. The method compries the steps of forming a generally cylindrical annulus having a first generally radially extending, tire bead retaining flange. A radially extending spider is formed and secured within the flange in a substantially conventional manner. Next, a tire is axially slid onto the unflanged end of the rim which may be either cylindrical or rolled radially inward to facilitate installation of the tire. The tire and rim are then secured in tooling which holds both beads of the tire away from the unrolled flange and provides a forming surface against which a second bead retaining flange may be formed.

In a preferred embodiment at least one or a plurality of forming rollers are brought into contact with the unflanged end of the rim and rotated circumferentially thereby rolling the flange into contact with the forming surface. Upon removal of the forming tools, the completed tire and rim may be removed from the tooling and inflated.

Alternatively the rim flange may be turned upward using electromagnetic forming techniques.

It is thus an object of the instant invention to provide an integral tire and rim which are virtually inseparable from one another.

It is a still further object of the instant invention to provide an integral tire and rim in which the wheel rim well has been eliminated.

It is a still further object of the instant invention to provide a method of assembling an integral tire and rim which is rapid, simple, and utilizes generally conventional manufacturing techniques.

Further objects and advantages of the instant invention will become apparent by reference to the following description of the preferred embodiment and appended drawings.

DESCRIPTION OF THE PREFERRED EMBODIMENT

Figure 1:
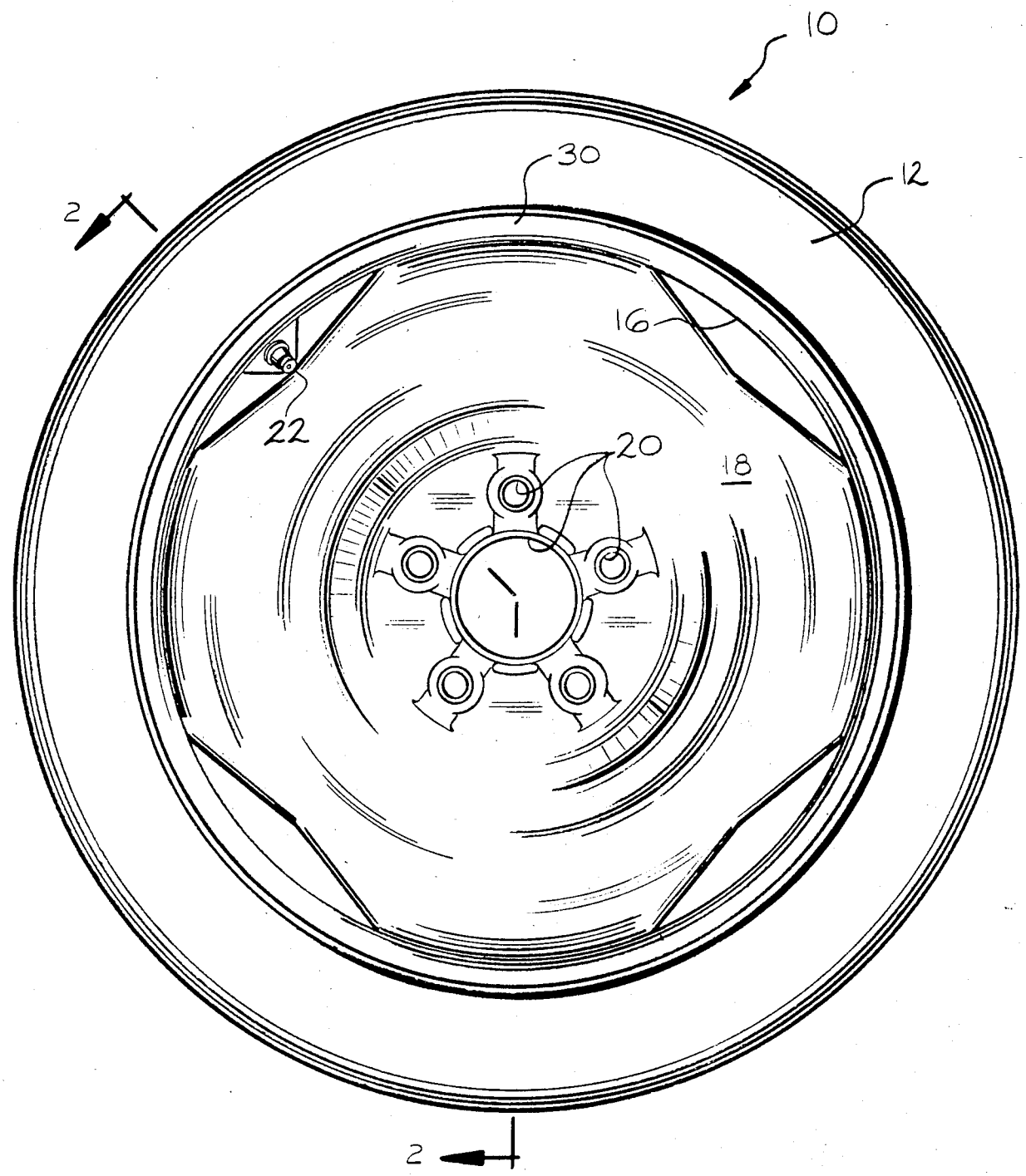
FIG. 1 is a front, elevational view of an integral tire and rim according to the instant invention.
Figure 2:
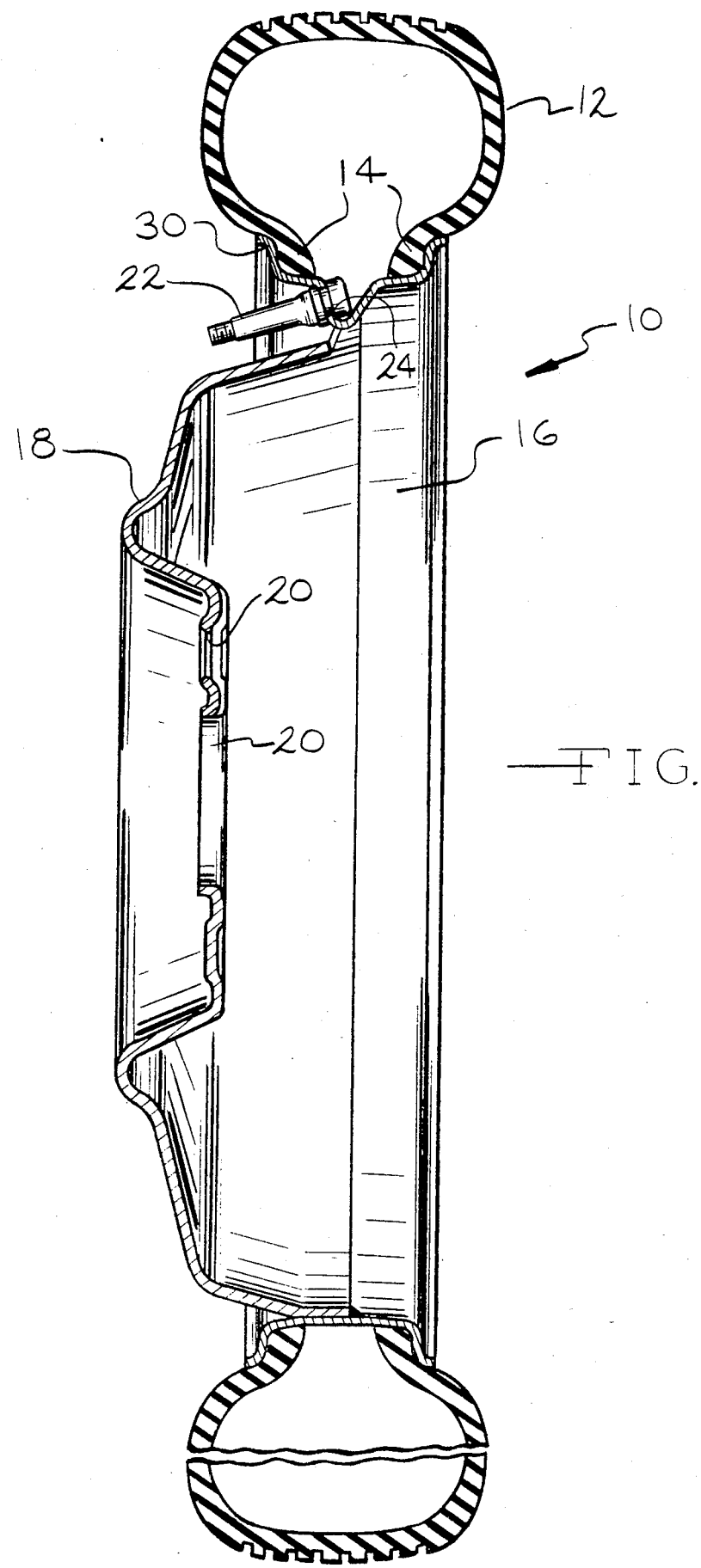
FIG. 2 is a full, sectional view of an integral tire and rim according to the instant invention and taken along line 2—2 of FIG. 1.
Figure 3:
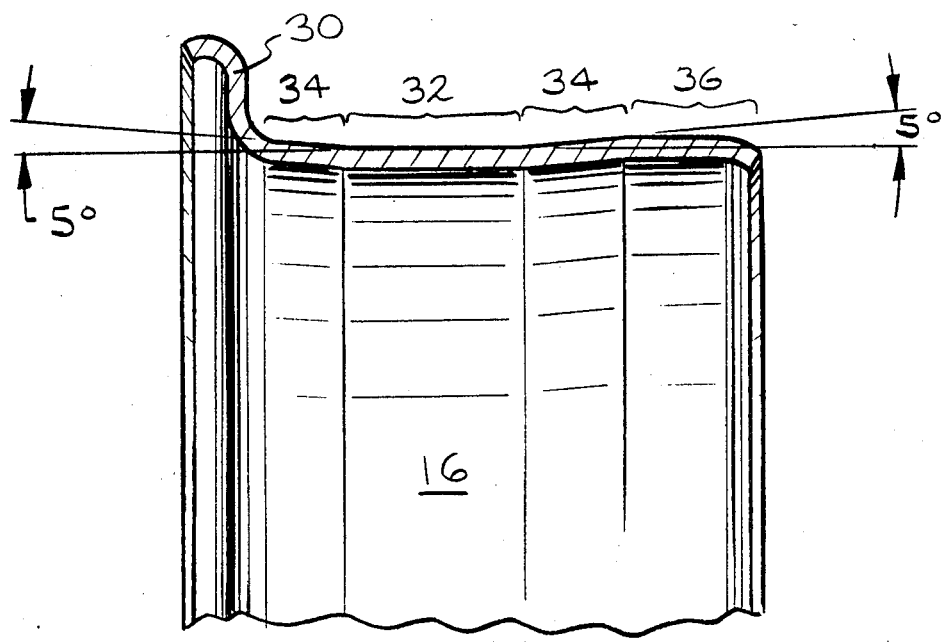
FIG. 3 is a fragmentary, sectional view of a wheel rim having a first cross section formed according to a step of the instant invention.

Referring now to FIGS. 1 and 2, an integral tire and wheel assembly fabricated according to the instant method is illustrated and generally designated by the reference numeral 10. The tire and wheel assembly 10 includes a pneumatic tire 12 built according to known tire building methods and having a pair of beads 14 which generally define an inner relatively inextensible diameter. Assembly 10 also includes a rim 16 and a centrally disposed spider 18.

Spider 18 includes suitable openings 20 which permit it to be received upon the center and lug bolts of a conventional vehicle hub (not illustrated). Preferably, the assembly 10 also includes a valve stem 22 which secured within opening 24 in valve boss 17 of rim 16.

Those familiar with motor vehicle tires and wheels may identify the high rim diameter to tread width ratio of the assembly 10 illustrated in FIG. 2 as that ratio generally associated with compact spare tires. Nonetheless, it should be understood that the instant disclosed invention may be readily practiced to produce vehicle wheel assemblies for use as conventional road wheels. Furthermore, it should be understood that the instant invention may be readily practiced with configurations of the spider 18 other than that illustrated in FIG. 2 and that such configuration is utilized for purposes of illustration and example but not limitation.

The instant method invention will be described with relation to FIGS. 3 through 8. First with regard to FIG. 3, a generally annular rim 16 is formed having but a single, substantially conventional, radially outwardly extending flange 30. Preferably, the rim 16 includes a generally flat, central region 32 having an outer surface which is disposed parallel to the axis of rotation of the rim 16 which is flanked on either side by a pair of frustoconical regions 34 disposed at an angle between 0° to approximately 5° to the axis of rotation of the rim 16, the preferred angle being 5 degrees. The rim 16 also includes an edge adjacent region 36 opposite the flange 30. The edge region 36, from which a second flange will be formed may be parallel to the axis of the rim 16 or may be rolled inwardly at a small acute angle, as illustrated, to facilitate the subsequent step of installing the tire 12 upon the rim 16. It will thus be appreciated that the rim 16 is absent a well, which conventionally accommodates installation of a tire, and therefore exhibits an uninterrupted surface between the flange 30 and edge adjacent region 36.

Figure 4:
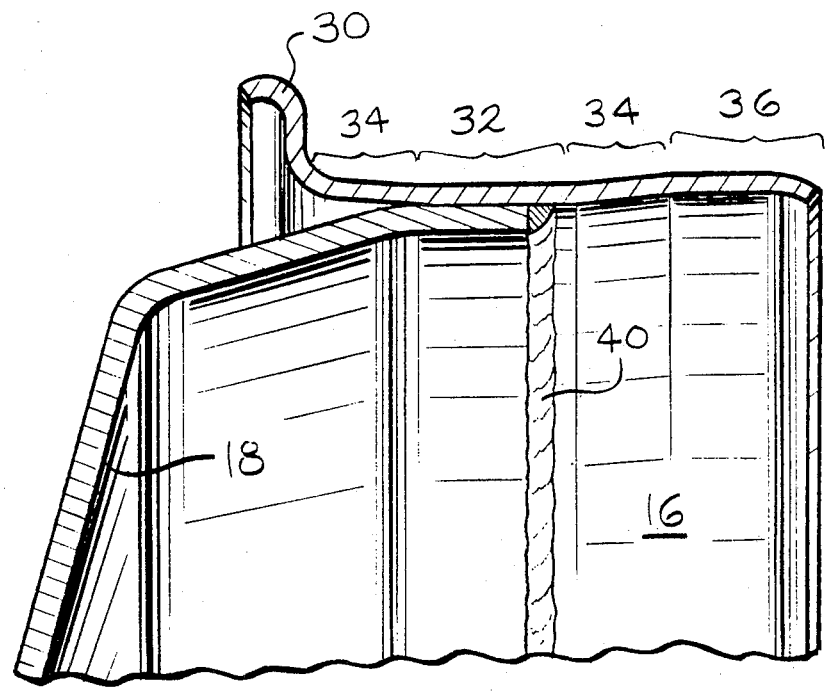
FIG. 4 is a fragmentary, sectional view of a wheel rim having a spider secured therein according to a step of the instant invention.

In FIG. 4, the spider 18 is concentrically positioned within rim 16 and secured thereto by welding or other fastening means. Weldment 40 is thus deposited along the juncture of the spider 18 and inner surface of the central region 32 of the rim 16.

Figure 5:
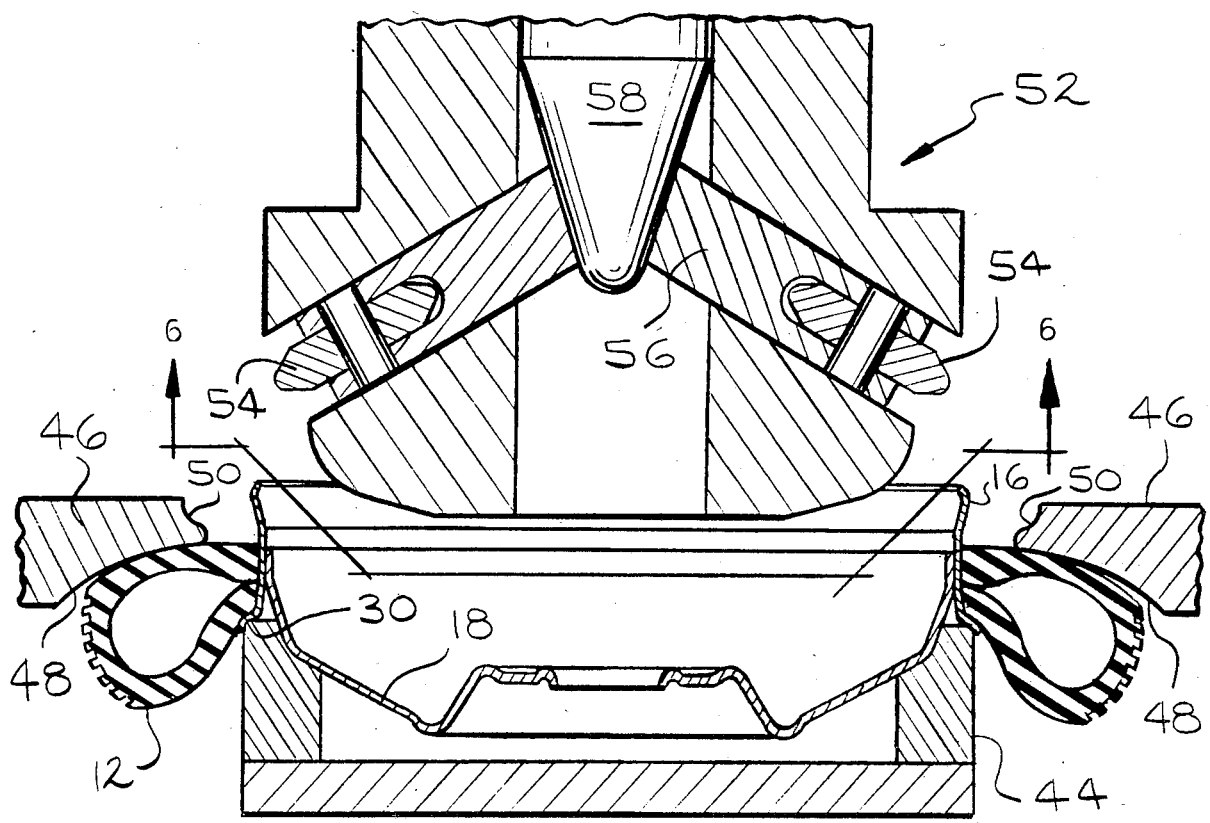
FIG. 5 is a diagrammatic, full sectional view of an integral tire and rim and second flange forming tooling which may be utilized to practice the instant invention.
Figure 6:
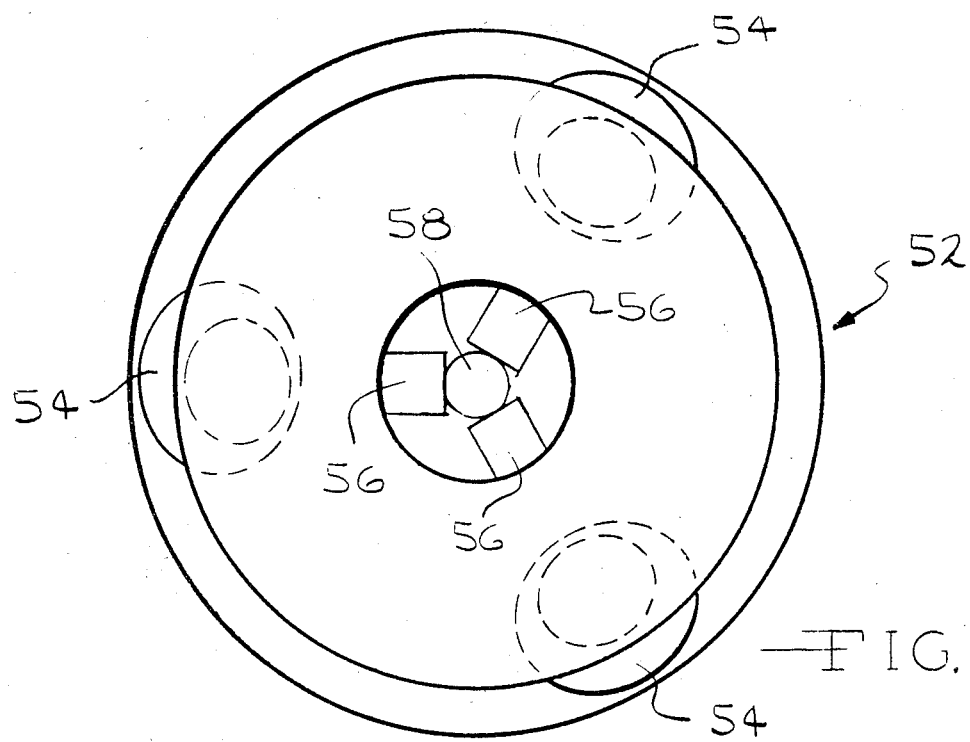
FIG. 6 is a full, sectional view of the second flange forming tooling according to the instant method taken along line 12—12 of FIG. 11.

Referring now to FIGS. 5 and 6, tooling for performing the fabrication of a second flange on the rim 16 is diagrammatically illustrated. Rim 16 and spider 18 which have been secured together in the previous fabrication step are positioned in a circular support structure 44 which cradles and positions the two components with their common center axis disposed in a vertical orientation. Concentrically disposed about the support structure 44 and the rim 16 and spider 18 are a plurality of die blocks 46. Die blocks 46 are preferably radially translatable toward and away from the rim 16 by suitable mechanism (not illustrated). The lower, inner surfaces 48 of the die blocks 46 are preferably concave and function to compress and axially slide the tire 12 toward the originally formed flange 30 of the rim 16 in order to displace it from the forming zone of the present operation. The upper, inner surfaces of the die blocks 46 are concave and define a plurality of die surfaces 50 against which the edge adjacent region 36 of the rim 16 may be accurately and positively formed into a second flange.

A tool assembly 52 is positioned above the rim 16 prior to the forming step. The axis of rotation of tool assembly 52 is disposed coincident with the center axis of the rim 16 and the spider 18. The tooling assembly 52 includes a plurality of rollers 54 disposed on obliquely extendable arms 56. The arms 56 are disposed at an acute angle to the axis of rotation of the tool assembly 52, such acute angle approximately equaling the angle between the axis of rotation of the tool assembly 52 and a reference line normal to the center point of the die surface 50. The value of the acute angle as shown is approximately 45° but may be any other suitable angle so as to respond to various manufacturing constraints and requirements. A centrally disposed drive cone 58 which may be axially advanced and retracted simultaneously and uniformly advances the arm 56 and the respective forming rollers 54 toward the rim 16.

Figure 7:
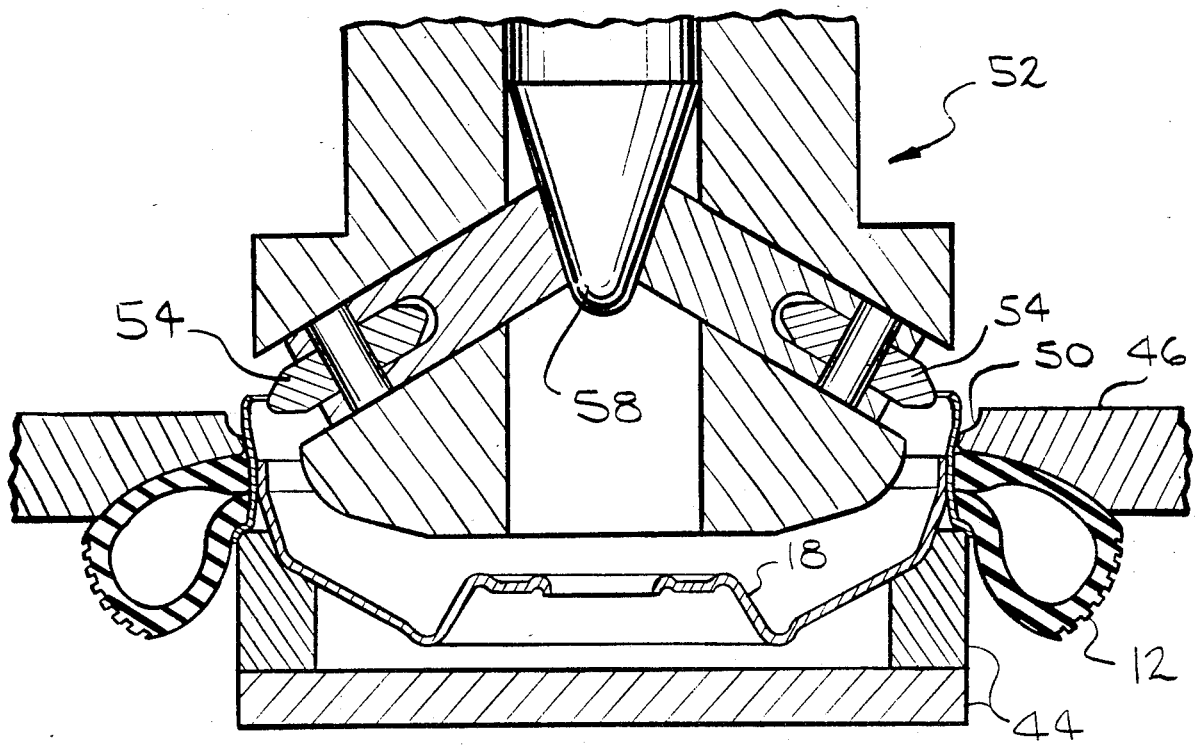
FIG. 7 is a diagrammatic, full sectional view of an integral tire and rim as well as forming tooling in position to begin the second flange forming step according to the instant invention.
Figure 8:
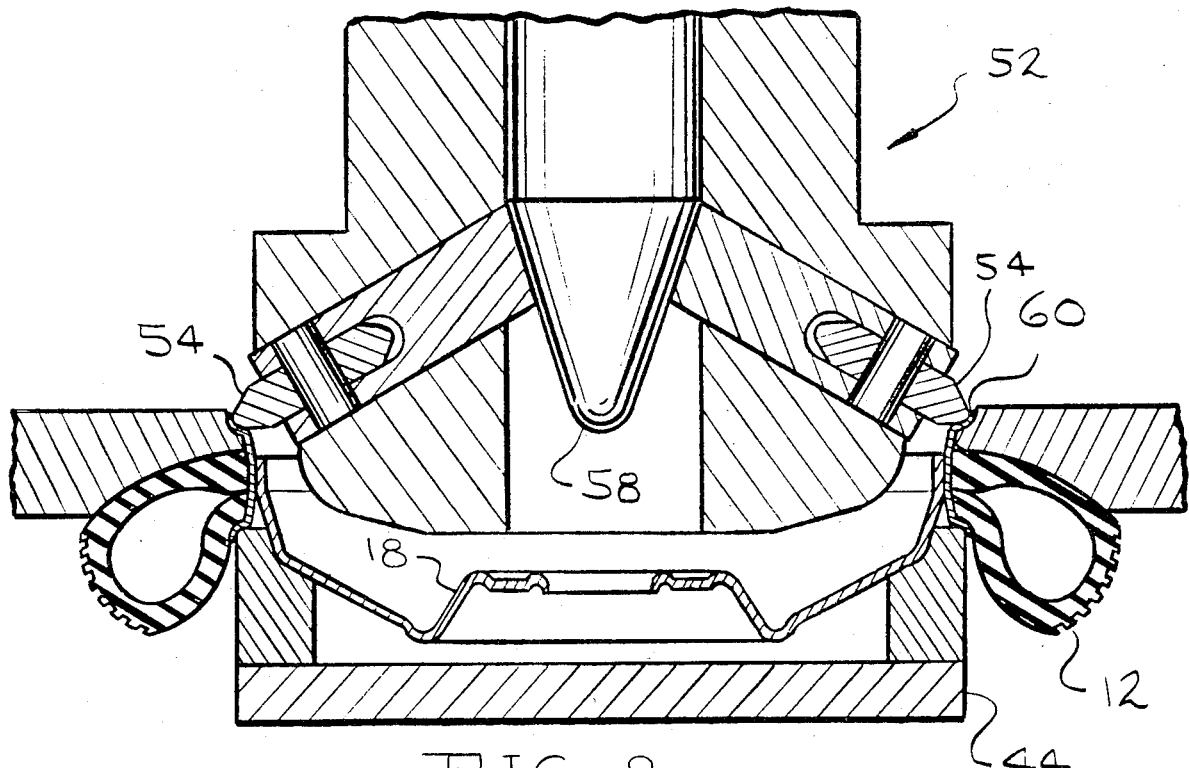
FIG. 8 is a diagrammatic, full sectional view of an integral tire and rim wherein the second flange forming step according to the instant method has been completed.

Referring now to FIG. 7, the die blocks 46 are advanced into contact with the rim 16 as illustrated. The die blocks 46 and specifically the inner, upper die surfaces 50 then form a continuous circumferential channel into which the edge adjacent region 36 of the rim 16 may be formed. At this time, the tooling assembly 52 may also be axially advanced toward the rim 16 such that the axes of the arms 56 are coincident with reference lines which are normal to the centers of the die surfaces 50. The tooling assembly 52 is then rotated about its axis and the drive cone 58 is advanced downwardly such that the arms 56 translate obliquely outwardly and the rollers 54 form the edge adjacent region 36 of the rim 16 into a second flange 60. It should be understood that a greater or lesser number of rollers 54 other than three may be utilized but that with such variation, an inverse relationship with the number of turns of the tooling assembly 52 is established. That is, a smaller number of rollers 4 necessitates that the tooling assembly 52 rotate a greater number of turns in order to properly form the second flange 60 and vice versa. It should also be noted that the forming operation just described is achieved by relative motion between the rim 16 and the tooling assembly 52 and that the same result may be achieved by rotating the rim 16 and the die blocks 46, etc., while holding the tooling assembly 52 stationary.

The tooling assembly 52 is then axially retracted, upwardly from the integral tire and rim assembly 10, the die blocks 46 are retracted radially away from the assembly 10, and the assembly 10 may be removed from the supports 44. A completed integral tire and rim assembly 10 is illustrated in FIGS. 1 and 2. With the addition of the valve stem 22 at a suitable point during its fabrication, the assembly 10 may now be inflated.

Alternatively the final rim flange may be formed after tire 12 has been placed upon preformed rim 16 using electromagnetic forming methods.

Figure 9:
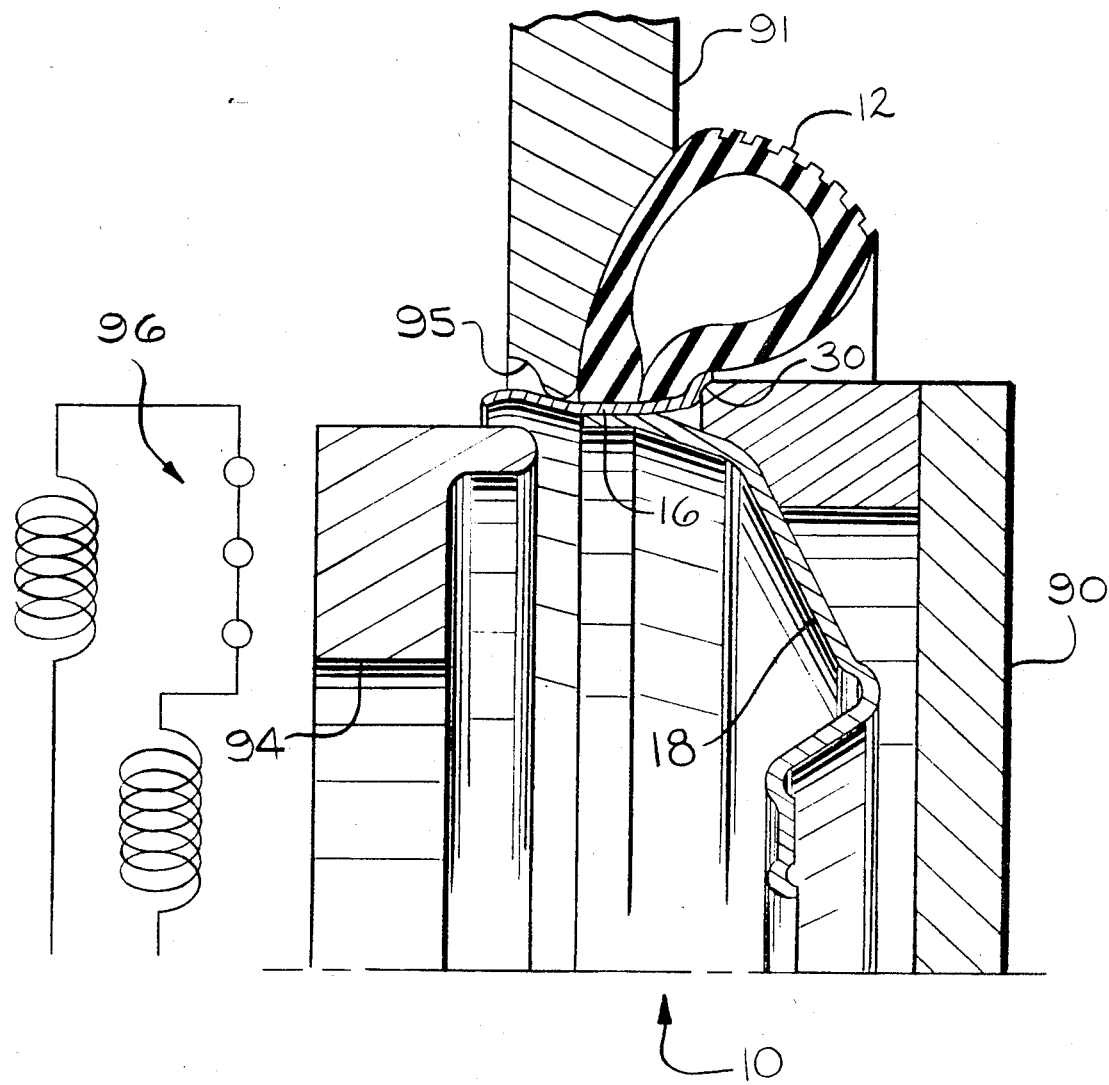
FIG. 9 is a diagrammatic sectional view of apparatus for electromagnetically forming the final rim flange of a tire and wheel assembly according to the present invention.

FIG. 9 diagrammetically shows typical apparatus for electromagnetically forming the final flange. The preformed rim 16 is placed in a suitable holding fixture 90 after which tire 12 is axially slipped into place. Die block 91 functions to axially compress tire 12 toward the originally formed flange 30 and provide an accurate profile of the flange to be formed. Torodial coils 96 in concert with the annularly shaped flux densifier 94 subject the rim edge 36 (FIG. 4) to action of an electromagnetic force which urges the rim edge against die blocks 91 and taking the shape of flange profile 95.

The electromagnetic force is provided by discharge of capacitor charges from a sufficient current source to obtain a force of several tens of kilojoules during a very short time period provided by the RLC relation of the coil.

The foregoing disclosure is the best mode devised by the inventors for practicing this invention. It is apparent, however, that apparatus and methods incorporating modifications and variations will be obvious to one skilled in the art of tire and rim manufacture. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A method of fabricating an integral tire and rim assembly comprising the steps of:
    providing a wheel having a generally annular rim including a pair of opposed edge regions,
    forming one of said pair of opposed edge regions into a first bead retaining flange,
    installing a tire on said annular rim between said first flange and the other of said pair of edge regions,
    disposing a plurality of die blocks about said rim,
    axially moving said die blocks so as to slide said tire toward said first flange, and
    moving a tool assembly into engagement with said other of said other edge regions so as to form said other of said edge regions into a second bead retaining flange against said die blocks.

2. A method of fabricating an integral tire and rim assembly comprising the steps of:
    providing a generally annular workpiece having opposed first and second peripheral edge regions,
    forming said first peripheral edge region into a first bead retaining flange,
    providing a spider and securing said spider to said workpiece,
    providing a tire and disposing said tire on said workpiece between said first bead retaining flange and said second peripheral edge region,
    providing a circumferential die surface adjacent said second peripheral edge region so as to slide said tire toward said first flange, and
    forming said second peripheral edge region into conformity with said die surface to produce a second bead retaining flange.

3. In a method of manufacturing a combination wheel and tire assembly, the steps of:
    (a) providing a wheel rim wherein said rim includes a first tire bead retaining flange,
    (b) placing a tire upon said wheel rim,
    (c) providing a circumferential die surface about said rim so as to slide said tire toward said first tire bead retaining flange, and
    (d) deforming said rim against said die surface to form a second integral and opposing tire bead retaining flange.

4. The method of claim 3 wherein said rim material is deformed by application of electromagnetic force.

5. A method of fabricating an integral tire and rim assembly comprising the steps:
    providing a wheel having a generally annular rim including a pair of opposed edge regions,
    forming one of the pair of opposed edge regions into a first bead retaining flange,
    installing a tire on the annular rim between the first flange and the other of the pair of edge regions,
    disposing a means for sliding the tire toward the first flange about the rim,
    axially moving the means for sliding the tire so as to slide the tire toward the first flange, and
    forming the other of the edge regions into a second bead retaining flange against the means for sliding the tire toward the first flange.

* * * * *